US012706900B2

(12) United States Patent
Gapakov

(10) Patent No.: US 12,706,900 B2
(45) Date of Patent: Aug. 11, 2026

(54) CROSS-CHANNEL AUTHENTICATION

(71) Applicant: DIGITAL FIRST HOLDINGS LLC, Atlanta, GA (US)

(72) Inventor: Timofei Gapakov, Kitchener (CA)

(73) Assignee: Digital First Holdings LLC, Atlanta, GA (US)

( * ) Notice: Subject to any disclaimer, the term of this patent is extended or adjusted under 35 U.S.C. 154(b) by 188 days.

(21) Appl. No.: 18/375,157

(22) Filed: Sep. 29, 2023

(65) Prior Publication Data

US 2025/0112909 A1 Apr. 3, 2025

(51) Int. Cl.
*H04L 9/40* (2022.01)

(52) U.S. Cl.
CPC .................................. *H04L 63/083* (2013.01)

(58) Field of Classification Search
CPC ..................................................... H04L 63/083
See application file for complete search history.

(56) References Cited

U.S. PATENT DOCUMENTS 8,572,701 B2 * 10/2013 Rathbun ............. H04L 63/0853 705/72
11,089,114 B1 * 8/2021 Saalfeld ................ H04L 43/103
2007/0033197 A1 * 2/2007 Scherzer ................. H04L 63/10
2011/0307938 A1 * 12/2011 Reeves, Jr. ......... H04L 63/1483 726/3
2015/0089585 A1 * 3/2015 Novack ................... H04L 63/08 726/3
2016/0048846 A1 * 2/2016 Douglas .................. G06F 16/23 705/318
2017/0142129 A1 * 5/2017 Peng ..................... H04L 63/061
2017/0295017 A1 * 10/2017 Hong ...................... H04L 9/321
2019/0164165 A1 * 5/2019 Ithabathula ............. G06F 21/34
2020/0403992 A1 * 12/2020 Huffman ............... H04W 12/12
2021/0044976 A1 * 2/2021 Avetisov ............... H04W 12/08
2021/0336949 A1 * 10/2021 Kohli ...................... H04L 63/18
2021/0342433 A1 * 11/2021 Fujita ...................... G06F 21/33
2024/0195801 A1 * 6/2024 Novick .................. G06Q 40/02
2024/0248977 A1 * 7/2024 Dantuluri ................ G06F 21/42
2024/0283664 A1 * 8/2024 Islam .................... H04L 9/3271

* cited by examiner

*Primary Examiner* — Catherine Thiaw
*Assistant Examiner* — Nega Woldemariam
(74) *Attorney, Agent, or Firm* — Notaro, Michalos & Zaccaria P.C.; John S Economou

(57) ABSTRACT

A method and a communication network are disclosed. A first computing device of a trusted computing system transmits an authentication request, for authenticating, in the trusted computing system, an identity of an individual, to a server of the trusted computing system. An authentication provider module, pre-registered with the trusted computing system and that is executing on a second computing device external to the trusted computing system determines that the authentication request has been transmitted to the server of the trusted computing system. The authentication provider module is configured to authenticate the identity of the individual independently of the trusted computing system, responsive to said determining. The authentication provider module authenticates the identity of the individual, and responsive to said authenticating, transmits a response to the authentication request to the server of the trusted computing system, thereby authenticating, in the trusted computing system, the identity of the individual.

18 Claims, 6 Drawing Sheets

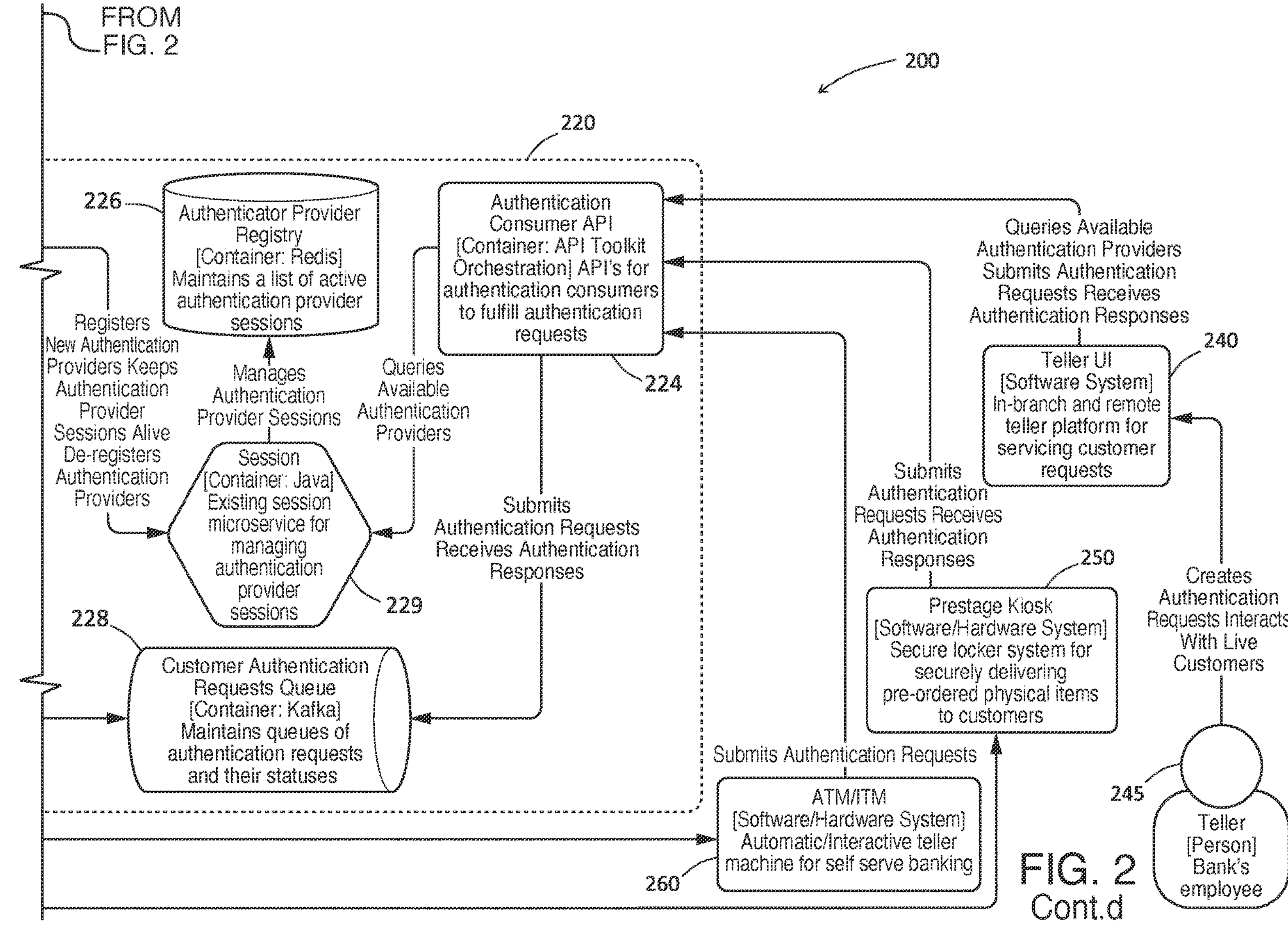
FIG. 2 Cont.d

CROSS-CHANNEL AUTHENTICATION

FIELD OF THE INVENTION

The present invention relates to a method and a communication network for authenticating an identity of an individual. In particular, but not exclusively, the present invention relates to a methodology in which an individual is able to authenticate their identity via authenticating themselves with an authentication provider that is in turn able to authenticate itself with a trusted computing system which ultimately needs to authenticate the identity of the individual.

BACKGROUND

In a banking or retail environment, it is well known that an individual must authenticate themselves before they are able to perform a transaction. For example, an individual must be able to verify their identity before they are able to withdraw funds from their bank account. This authentication of an individual's identity happens regardless of whether the transaction is taking place at an Automated Teller Machine (ATM), a kiosk, in-branch at a physical teller or when communicating with a remote teller using an Interactive Teller Machine (ITM).

Typically, anyone with a credit card or debit card can access transaction services at these locations by authenticating themselves by providing their bank card and a PIN only known to them. When using an in-branch or remote teller, physical ID may also be provided as further verification of the individual's identity.

However, there are occasions when a customer only has access to their mobile device but does not have access to their banking cards or any forms of physical identification to enable them to perform transactions. In these situations, they are left unable to perform transactions.

This is undesirable for customers. Additionally, when scanning an ID card at an ITM, the authentication process is time consuming and there are occasions when an ID card is left in the scanner. This scanning process also necessitates ID scanner hardware on the ITM and there are also privacy concerns with sending scanned images of a customer's ID.

To date, there has been no technical implementation that enables a customer to efficiently conduct cardless authentication by making use of a device in their possession to authenticate their identity.

SUMMARY

It is an aim of the present invention to at least partly mitigate one or more of the above-mentioned problems.

It is an aim of certain embodiments of the present invention to help provide a methodology for cardless authentication of an individual's identity at an ATM, kiosk or bank teller.

It is an aim of certain embodiments of the present invention to help authenticate an identity of an individual.

It is an aim of certain embodiments of the present invention to help remove the need for ID scanning hardware on certain computing terminals on which an individual needs to authenticate their identity (e.g., an Interactive Teller Machine).

It is an aim of certain embodiments of the present invention to help reduce a time required for authentication of a customer's identity compared to showing physical ID.

It is an aim of certain embodiments of the present invention to help provide authentication providers that have been pre-registered with a trusted computing system, and to allow the authentication providers to authenticate customers whilst the trusted computing system only authenticates the authentication providers. In this way, authenticating customers is offloaded to authentication providers, which abstracts out the process of customer authentication and only requires trust between a trusted system and a customer authentication provider. This may be described as we trust you and you authenticate your customer, which means we trust the information about your customer that you provide us.

According to a first aspect of the present invention there is provided a computer-implemented method for authenticating, in a trusted computing system, an identity of an individual, comprising the steps of: transmitting, by a first computing device of a trusted computing system, an authentication request, for authenticating, in the trusted computing system, an identity of an individual, to a server of the trusted computing system; determining, by an authentication provider module, pre-registered with the trusted computing system and that is executing on a second computing device external to the trusted computing system, that the authentication request has been transmitted to the server of the trusted computing system, wherein the authentication provider module is configured to authenticate the identity of the individual independently of the trusted computing system; responsive to said determining, authenticating, by the authentication provider module, the identity of the individual; and responsive to said authenticating, transmitting, by the authentication provider module, a response to the authentication request to the server of the trusted computing system, thereby authenticating, in the trusted computing system, the identity of the individual.

Aptly, the method further comprises transmitting, by the server, said response to the authentication request to the first computing device.

Aptly, the method further comprises detecting, by the first computing device, an input event indicating that the individual is to be authenticated via a cardless authentication process.

Aptly, the method further comprises generating, by the first computing device, the authentication request.

Aptly, the method further comprises generating the authentication request as a set of data comprising at least a request identifier for the request and a device identifier for the first computing device.

Aptly, the method further comprises responsive to receiving the authentication request at the server, providing the authentication request to an authentication request queue on the server.

Aptly, the method further comprises monitoring, by the authentication provider module, the authentication request queue on the server for authentication requests that can be fulfilled by the authentication provider module.

Aptly, the method further comprises responsive to receiving the response to the authentication request at the server, providing the response to an authentication response queue on the server.

Aptly, the method further comprises monitoring, by the first computing device, the authentication response queue for responses to authentication requests generated by the first computing device.

Aptly, the method further comprises executing a first application programming interface on the server, that is configured to communicate with the authentication provider module.

Aptly, the method further comprises executing a second application programming interface on the server, that is configured to communicate with the first computing device.

Aptly, the method further comprises storing, in a memory on the server, data indicating a list of available authentication provider modules that are able to fulfil authentication requests.

Aptly, the method further comprises providing a first authentication token, issued by a trusted identity provider module of the trusted computing system, to the authentication provider module; and pre-registering the authentication provider module with the trusted computing system by providing the first authentication token to the server.

Aptly, the method further comprises when transmitting the response to the authentication request to the server, providing the first authentication token; and authenticating, by the server, the first authentication token to authenticate the authentication provider module.

Aptly, the method further comprises providing a second authentication token, issued by an identity provider module external to the trusted computing system, to a computing device of the individual; and when authenticating the identity of the individual via the authentication provider module, transmitting the second authentication token from the computing device of the individual to the authentication provider module.

Aptly, the method further comprises continuously transmitting, by the authentication provider module, a ping to the server to indicate the authentication provider module is available to fulfil authentication requests.

According to a second aspect of the present invention there is provided a communication network, comprising: a trusted computing system comprising at least one first computing device and at least one server; a non-trusted computing system, external to the trusted computing system, comprising at least one second computing device executing a respective authentication provider module that is configured to authenticate an identity of an individual independently of the trusted computing system and that is pre-registered with the trusted computing system; wherein the first computing device is configured to: transmit an authentication request, for authenticating, in the trusted computing system, the identity of the individual, to the server; wherein the respective authentication provider module is configured to: determine that the authentication request has been transmitted to the server; authenticate the identity of the individual; and transmit a response to the authentication request to the server to thereby authenticate, in the trusted computing system, the identity of the individual.

Aptly, the first computing device is an Automated Teller Machine or Self-Service Terminal or kiosk.

Aptly, the first computing device is a desktop computer or a laptop or a mobile device of a bank teller.

Aptly, the second computing device is a server of the non-trusted computing system and the respective authentication provider module is a mobile backend associated with a mobile banking application executing on a mobile device of the individual.

Certain embodiments of the present invention help offload authentication of customers to authentication providers, which abstracts out the process of customer authentication and only requires trust between a trusted system and a customer authentication provider.

Certain embodiments of the present invention help provide a communication network and associated methodology in which customer's are able to authenticate their identity in the absence of any physical documents (such as bank card or photographic identification), by leveraging use of a device in their possession that can be used to authenticate the customer with an authentication provider.

Certain embodiments of the present invention help avoid a requirement for a trusted computing system to directly authenticate an identity of an end user at an ATM or kiosk or bank teller when the user has no bank cards or identification in their possession.

Certain embodiments of the present invention help provide an efficient methodology for conducting cardless authentication of an identity of a user.

Certain embodiments of the present invention help provide a way to conduct cross-channel authentication, where cross-channel means that the means of one channel does not match the requirements of another. For example, an ATM requires a user to authenticate themselves to access transaction services (requirements of one channel) but the user does not have any bank cards or ID on their person so cannot authenticate themselves (the means of the other channel do not match the first channel's requirements).

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
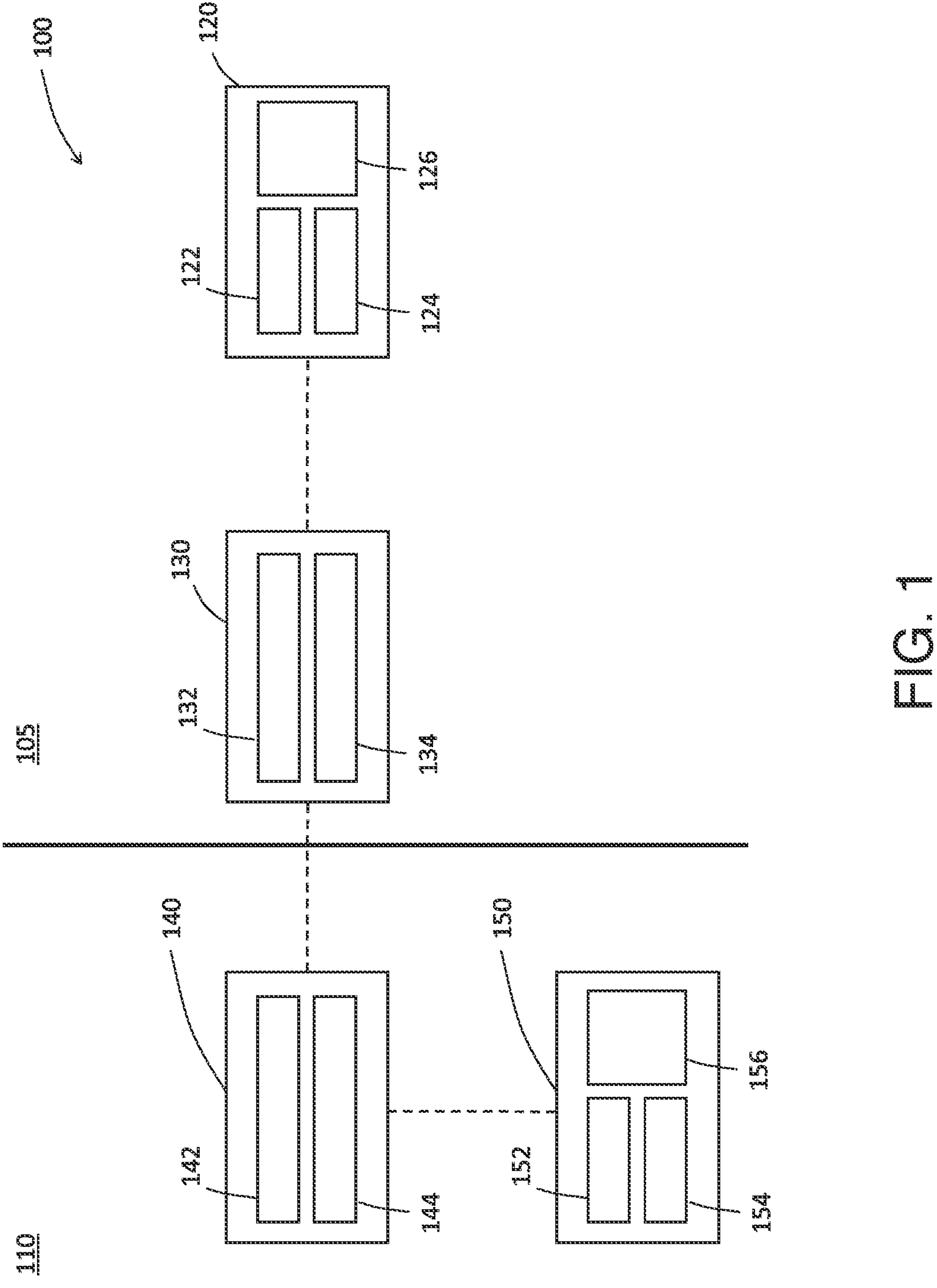
FIG. 1 illustrates a communication network.

FIG. 1 illustrates a communication network 100. In the communication network 100 there is a trusted computing system 105 and a non-trusted computing system 110. By "trusted" it is meant that the components within this system all have an internal authentication token that can be used to authenticate that component as part of the trusted system. The designer of the system also has internal control over operation of the components in the system. By "non-trusted" it is meant that the components within this system do not have an internal authentication token and thus cannot be trusted unless they are able to provide a specific authentication token that they have been provided with by the trusted system (i.e., they have been pre-registered by the trusted system). The non-trusted system is also external to the trusted system and may have been developed by a third-party so the designer of the trusted system has no control over the operation of this system. The trusted computing system 105 includes a first computing device 120 and a server 130. It will be appreciated that more than one first computing device and more than one server may be present in the trusted computing system. In the non-trusted computing system 110, there is a second computing device 140 and a mobile device 150 of an individual. It will be appreciated that more than one second computing device and more than one mobile device may be present in the non-trusted computing system. The first computing device may be a Self-Service Terminal or an Automated Teller Machine or a kiosk. The first computing device may also be a desktop computer or laptop or mobile device of a bank teller. The bank teller may be either in-branch or remote from the branch. If the first computing device is an ATM, the ATM may or may not be an Interactive Teller Machine (ITM).

The first computing device 120 includes one or more processors 122, at least one memory 124 and a display 126. The memory is a non-transitory computer-readable storage medium. The memory 124 stores executable software that is executable by the processors 122 of the first computing device. The display 126 displays a graphical user interface for enabling a user of the device to enter details and select options. The first computing device may also include a communication interface (not shown) for communicating with the server 130. Where the first computing device is an ATM, the computing device may also include an encrypted PIN pad (not shown), a note dispenser (not shown), a receipt printer (not shown), a card slot (not shown) for insertion of a user's bank card, a camera (not shown), a barcode reader (not shown), a microphone (not shown), speakers (not shown) or the like as will be appreciated by a person of skill in the art. When the ATM is an ITM, the ATM may further include additional functionality. For example, the ITM may include a signature pad (not shown), an ID scanner (not shown), a telephonic handset (not shown), a wired headset (not shown), a tactile keyboard (not shown), a beamforming microphone (not shown) or the like as will be appreciated by a person of skill in the art. This hardware may not be present on a conventional non-ITM ATM. The ITM may also have functionality to enable an audio and video communication link to be established with a remote teller device. This functionality may not be present on a conventional non-ITM ATM.

The server 130 also includes one or more processors 132 and at least one memory 134. The memory 134 is also a non-transitory computer readable storage medium. The memory 134 stores executable software that is executable by the processors of the server. The server may also include a communication interface (not shown) for communicating with the first computing device and the second computing device.

The second computing device 140 also includes one or more processors 142 and at least one memory 144. The memory 144 is also a non-transitory computer readable storage medium. The memory 144 stores executable software that is executable by the processors of the second computing device. The second computing device may also include a communication interface (not shown) for communicating with the server and the mobile device. The second computing device may for example be a server but it could be any device that is able to authenticate an individual and send an authentication response to the trusted system.

The mobile device 150 of the user is for example a smartphone or tablet or the like. The mobile device 150 also includes one or more processors 152, at least one memory 154 and a display 156. The memory 154 is also a non-transitory computer readable storage medium. The memory 154 stores executable software that is executable by the processors of the mobile device. The display 156 also displays a graphical user interface. The mobile device may also include a communication interface (not shown) for communicating with the second computing device.

The components of the trusted and non-trusted computing devices may communicate with one another via a network (not shown). The network may be wired, wireless or a combination of wired and wireless. For example, the network may be the internet.

Figure 2:
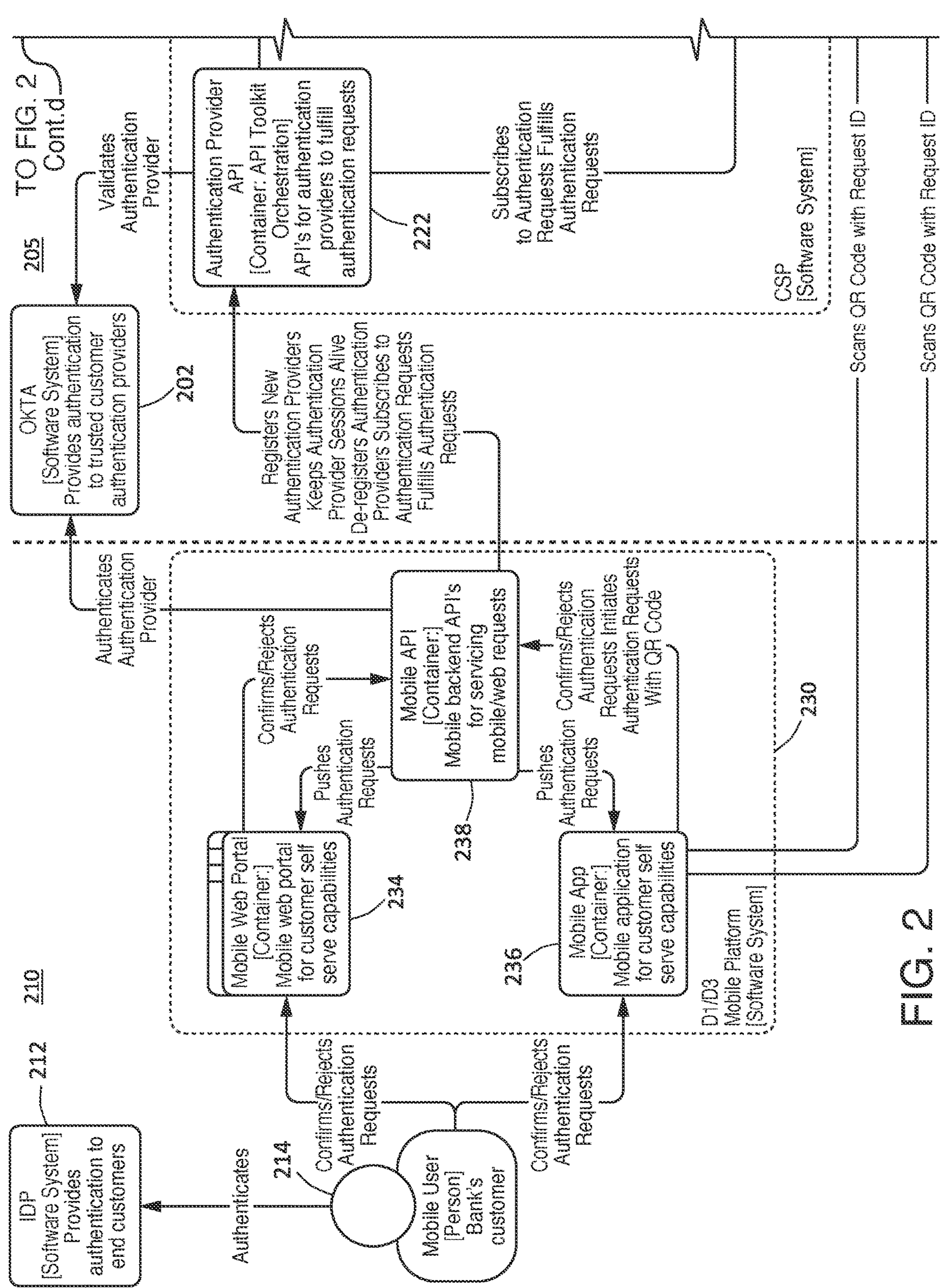
FIG. 2 illustrates components of a communication network.

FIG. 2 illustrates components of a communication network 200 along with their users in more detail. The network may be similar to that shown in FIG. 1. In the network 200, there is a trusted computing system 205 and a non-trusted computing system 210 (separated by the dotted line). Reference is made below to Customer Authentication Providers (CAPs) and Customer Authentication Consumers (CACs). A CAP may also be referred to as an "authentication provider". A CAP is at least one software module that is used to authenticate an identity of an individual independently of the trusted system and that executes on a computing device that is external to the trusted system. In some embodiments, a CAP may also be a combination of at least one hardware module and the at least one software module.

Particularly, the computing device on which the software module(s) is/are executing may form part of the CAP (e.g., in the case of a retina scanner). A CAP is responsible for authenticating itself to the Channel Services Platform's (CSPs) identity provider, Okta (discussed below), and then registering itself as a CAP with the CSP and announcing itself via keep alive pings. Further, this component is responsible for monitoring the authentication request queue for authentication requests matching its own capabilities and fulfilling them. A CAC is any component (hardware and/or software) that submits authentication requests and receives authentication responses.

In FIG. 2, the CSP 220 is the main component of the trusted system. The CSP is the Channel Services Platform. This component represents an existing platform that hosts many services in order to enable various cross channel financial transactions. This platform is responsible for authenticating CAPs and CACs and hosts APIs through which CAPs and CACs interact. The mobile platform 230 is the main component of the non-trusted system. The mobile platform represents an external system (external to CSP) that hosts CAPs as well as systems of interaction for the customer. It is ultimately responsible for authenticating and trusting mobile users/customers.

Focusing first on the non-trusted system, there is a component labelled IDP 212. The IDP is the external system's identity provider. This component represents the system to which end customers authenticate. This identity provider is considered external/foreign to the Channel Services Platform (CSP) system (described below) and tokens from this provider will not be recognized or trusted by the CSP system. However, this identity provider is used to authenticate end customers to their own mobile platform. CSP then establishes trust with the mobile platform itself, rather than end customers or the external IDP 212. More generally, this component represents any means by which an external system (mobile platform in this example) is able to effectively authenticate their end users. In more detail, IDP 212 is able to provide a mobile device of mobile user 214 with an authentication token that the mobile device can then provide to an authentication provider (e.g., Mobile API 238) when needed to authenticate the identity of the individual (mobile user). This token may be issued by IDP 212 when the mobile device first requires it and then the token may then be used on multiple occasions each time the mobile device needs to perform authentication. The token may have also have an expiry period and so a new authentication may need to be obtained from IDP 212 from time to time.

A mobile user 214 is shown using part of the non-trusted system. This component represents the end customer, the user who needs to be authenticated at various points of interaction/channels. Mobile user authenticates themselves via the external IdP 212, which makes them a trusted user of the mobile app and web portal. This user may also interact with ATM/ITMs and Prestage Kiosks/Lockers for the purpose of scanning QR code or using OTPs to prove their identity and to then further perform required transactions. This user also interacts with a bank teller who is either at the branch or who is located remotely from the branch (e.g., using Interactive Teller functionality on an ITM).

Within the mobile platform 230 there is a mobile web portal 234, a mobile app 236 and a mobile Application Programming Interface (API) 238. The web portal 234 may execute on a mobile device of the mobile user. This component represents a system of interaction through which a customer may perform various self-serve operations, including authentication and confirmation of identity. The mobile web portal may also allow step up authentication through one time passcodes sent via SMS or email. The mobile app 236 may also execute on a mobile device of the mobile user. The app may be used as an alternative to the web portal. This component represents a system of interaction through which a customer performs various self-serve operations, including authentication and confirmation of identity. The mobile app may also allow step up authentication and biometric authentication, depending on the capabilities of the mobile device. The mobile API 238 represents the backend of the external system which establishes trust with the mobile user/customer. This component represents a trusted Customer Authentication Provider (CAP). As discussed above, this component may be responsible for authenticating itself to the CSP's identity provider, Okta (discussed below), and then registering itself as a CAP and announcing itself via keep alive pings. Further, this component is responsible for monitoring the authentication request queue for authentication requests matching its own capabilities and fulfilling them.

Turning now to the trusted part of the communication network, there is shown a component labelled Okta 202. This component represents a CSP trusted identity provider. Once vetted, the CAP is issued credentials in Okta such that it can authenticate itself and obtain a trusted authentication token that will then be used to connect to CSP and fulfil authentication requests. The token issued to CAP will contain claims that will indicate various information about CAP, including the level of trust, step up capabilities, etc. In more detail, Okta 202 is able to provide an authentication provider such as Mobile API 238 with an authentication token that the authentication provider can then provide to CSP (executing on a server) when needed to authenticate the authentication provider. This token may be provided to CSP initially when the authentication provider pre-registers itself with CSP and also each time the authentication provider sends an authentication response to the CSP. This token may be issued by Okta 202 when the authentication provider first requires it and then the token may then be used on multiple occasions each time the authentication provider needs to perform authentication. The token may have also have an expiry period and so a new authentication may need to be obtained from Okta 202 from time to time.

Within the CSP 220 there is an Authentication Provider Application Programming Interface (API) 222, an Authentication Consumer Authentication Programming Interface (API) 224, an Authentication Provider Registry 226, a Customer Authentication Request (and Response) Queue 228 and a Session Service 229. The Authentication Provider API 222 represents an API that is hosted by CSP and enables CAPs to register themselves, keep the session alive, subscribe to be notified of new authentication requests, and fulfil applicable authentication requests. To access this API, CAP has to provide a valid token from Okta. The Authentication Consumer API 224 represents an API with which (CACs) can interact. This API is hosted by CSP and allows CACs to query available CAPs, submit authentication requests, and receive authentication responses. To consume this API, a regular internal CSP token is required. The Authentication Provider Registry 226 represents a datastore of currently active and available CAPs. Once CAP's register themselves and connect to CSP via the Authentication Provider API, they maintain a ping to keep their session alive and to indicate that they are available to take on authentication requests. The active sessions are stored in this registry and are retrievable by CACs. The Customer Authentication Request (and Response) Queue 228 represents a queue of pending customer authentication requests as well as a queue of fulfilled authentication responses. Once a CAC generates an authentication request, it is put in the pending authentication request queue. Various CAPs subscribe to this queue to be notified of new requests. The queue can be further segregated by request type such that only relevant CAPs are notified of requests that they are able to fulfil. Once a CAP is notified, it will take the request from the queue, fulfil it and place an authentication response on the response queue, referencing the original request. CACs subscribe to the response queue and get notified once new responses are available. CACs monitor the queue for relevant responses matching the requests that they've submitted. The Session Service 229 represents an internal CSP service that is used to maintain CAP sessions by interacting with the Authentication Provider Registry. This is a utility microservice.

Also part of the trusted system is a Teller User Interface (UI) 240, a Prestage Kiosk 250, and an ATM/ITM 260. The teller UI represents a system of interaction that Teller users leverage while servicing a customer in the branch. This system also represents the tool that remote tellers will leverage while interacting with remote customers via an ITM. Teller UI is a CAC-responsible for generating and submitting customer authentication requests in order to authenticate the customer in the branch. A teller 245 is shown in FIG. 2 using the Teller UI. The teller represents a user, a person, who is interacting with Teller UI. This person physically interacts with the customer and then produce authentication requests via the Teller UI tool. The Prestage Kiosk 250 and ATM/ITM 260 are other systems of interaction with which a customer/mobile user can interact. The Prestage Kiosk or ATM/ITM may generate a unique, short lived QR code that the customer may scan with their mobile device. The QR code can open the relevant mobile banking app/web portal and allow the customer to authenticate. Prestage Kiosk and ATM/ITM are examples of a CAC-they generate authentication requests and receive authentication responses once the customer confirms their identify via the mobile app/web portal after having scanned the QR code. It is noted that instead of a QR code, an OTP may also be provided to the user for manually inputting into the banking app/web portal for authentication of the user.

Figure 3:
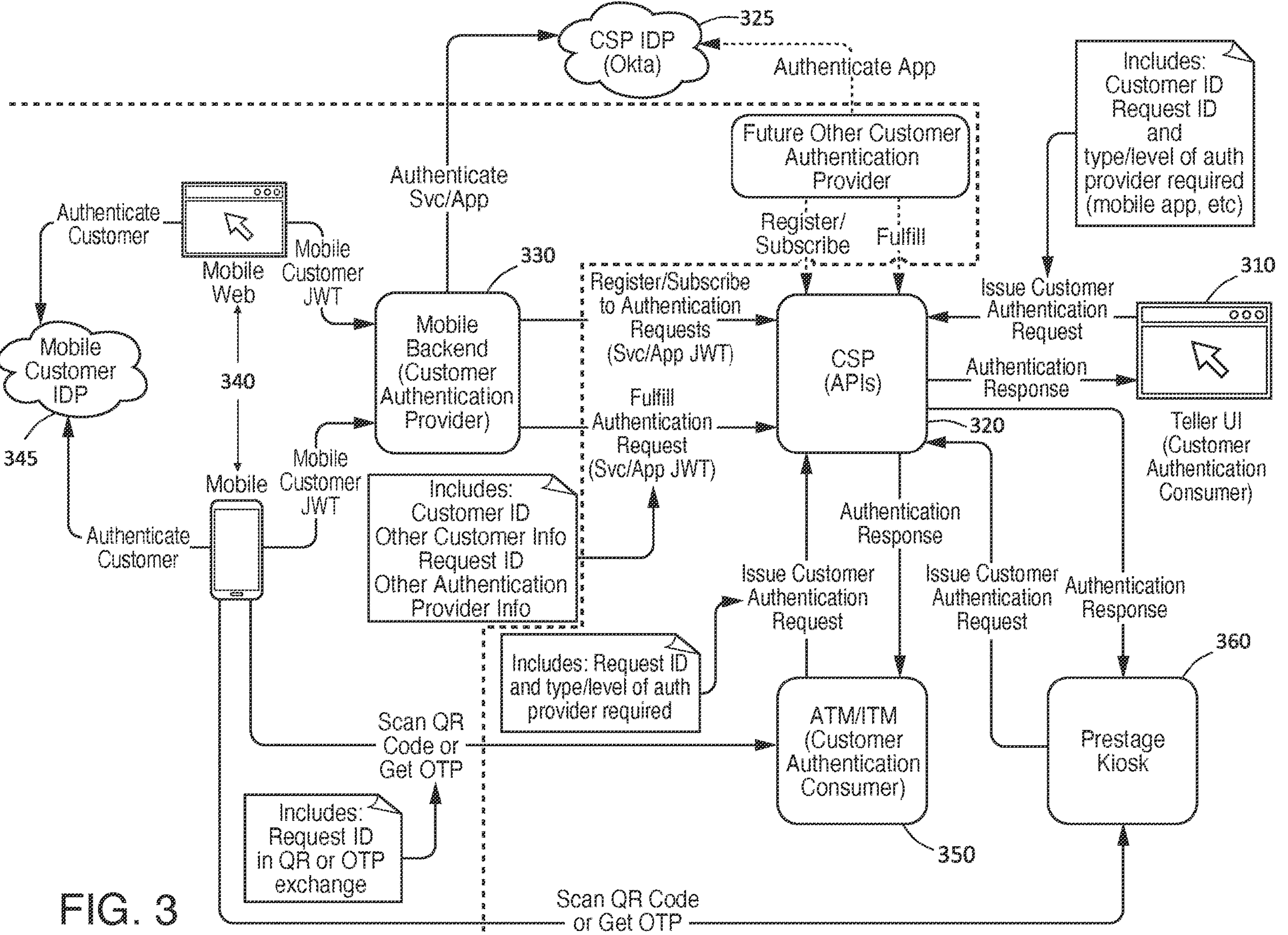
FIG. 3 illustrates interactions between components of a communication network.

Processes for cardless authentication of an identity of an individual will now be described with respect to FIG. 3. First, a process that may take place when a user/customer arrives in branch and speaks to a bank teller is described. Firstly, the customer arrives at a physical financial institution branch and proceeds to a teller. The teller asks the customer to present physical identification (bank card, driver's license, etc). Then the customer informs the teller that they do not have documents with them and would like to proceed with cardless authentication. Following this, the teller asks the customer their name and searches for the customer by name in Teller UI system 310. Once a possible match is found, the teller selects the customer in the list and initiates a cardless authentication flow. This is detected as an input event on the teller machine indicating that the individual is to be authenticated via a cardless authentication process. The Teller UI system queries the CSP 320 to obtain a list of currently available customer authentication providers (CAPs) and displays them to the teller on the Teller UI 310. The next steps are now described on the presumption that a mobile banking application is in the list of available CAPs. If this is the case, the teller asks the customer if they are a mobile banking user and if so would they like to confirm their identity using the mobile banking app. If the customer confirms that they are a mobile banking user, the teller selects mobile app as the preferred CAP to authenticate the customer. The Teller UI system 310 then generates a new customer authentication request which includes the selected CAP, the customer's name and ID from the banking core system (or some other universal customer ID). The request also populates additional required attributes that the CAP must meet, such as trust level, whether MFA (multi factor authentication) is required, etc. The request also contains information about the physical branch and the nature of the request. The request is then transmitted to the CSP 320 and given an authentication request ID and then added to the authentication request queue. At the same time, the mobile application backend system 330 is monitoring the request queue and sees a request that matches its own capabilities. Specifically, this particular request is requesting this specific CAP (mobile app), because the customer indicated that as their preferred way to authenticate. The CAP therefore picks up the request from the queue and generates a push notification to the customer's device 340. The customer is selected based on the customer identifier that was included in the authentication request. The customer that is in the branch receives a push notification from their mobile banking app. If the customer is not already signed into their mobile app, then the app prompts them to sign in as per the usual mobile app process. The notification asks the customer if they are requesting to be authenticated at a physical branch, specifying the details of the branch. The customer then acknowledges the request, confirming that they are indeed requesting to authenticate at that branch. If the original request had also indicated that MFA is required, the mobile application proceeds to ask the customer to do a face scan or finger scan, depending on what the customer had previously configured in the mobile application. The mobile application on the mobile device 340 then submits the confirmation that the customer has approved this request to the mobile backend (CAP) 330. This includes providing the authentication token obtained from the mobile customer IDP 345 (described with respect to FIG. 2). The mobile backend (CAP) then generates a new customer authentication response, referencing the original authentication request ID, and providing a customer ID as well as other relevant customer information, also indicating that the customer has approved the authentication request and has performed MFA (if that was required in the request). This authentication response is then submitted into the response queue on the CSP 320. The response includes the authentication token that was obtained by the CAP from Okta 325 (described in relation to FIG. 2). The API that accepts such responses verifies the token from the CAP (by communicating with Okta 325—described with respect to FIG. 2), making sure that this CAP is entitled to submit responses with the provided attributes (trust level, MFA performed, etc). The teller UI application (backend) is monitoring the response queue for responses matching its initial request ID. Once it sees this response come in, the teller UI application is notified with the details of the response. The teller UI then notifies the teller that the customer has been authenticated and that it is indeed the correct person that was initially searched and found by the teller in the system. The bank teller then proceeds to bring the customer into session as usual and perform requested transactions.

Now, a process that may take place when a user/customer arrives at an ATM/ITM 350 or pre-staged kiosk/locker 360 is described. It is noted that the steps described in this process are similar for any terminal with a screen and ability to communicate with the CSP cloud platform. As such, in the following description, an ATM is used as an example, but the process is applicable to ATM, ITM and Prestage Kiosk flows or the like. Firstly, a customer walks up to an ATM and is presented with multiple menu options and instructions. One such option is cardless authentication. If the customer does not have their bank card with them, they select cardless authentication. This selection is detected as an input event by the ATM indicating that the individual is to be authenticated via a cardless authentication process. The ATM then communicates with the CSP to obtain a new authentication request ID. The ATM then generates a new customer authentication request. The request is a set of data including various pieces of information including the request ID for the request and a device ID for the ATM. This request is anonymous since the ATM does not know who the person standing in front of them is. However, the request may specify the minimum trust level of the CAP required and that MFA must be performed when authenticating this customer. The ATM then transmits the request to CSP 320 and the request is added to the request queue. The request queue is being monitored by the mobile backend 330. At the same time, a QR code is generated that is shown on the screen of the ATM. It is noted that a One-Time Passcode (OTP) could also be displayed on the screen in addition to or instead of the QR code. The QR code contains a link to the mobile app/web portal and also contains the ID of the authentication request that was just submitted by the ATM. In some embodiments, this request is short lived with no more than a couple of minutes of validity for security reasons. Once the QR code is displayed, the customer scans the QR code with their mobile device (e.g., phone). The mobile device then launches the mobile banking app that is configured to launch when a specific website is requested. The URL in the QR code instructs the mobile app to start a mobile authentication flow with the provided request ID (in the QR code). If the customer is not already signed into their mobile app, then the app prompts them to sign in as per the usual mobile app process. It is noted that if the customer wishes to use the OTP instead of the QR code, the user alternatively signs in to their mobile app, selects the cardless authentication at ATM option, and then inputs the OTP into the mobile app together with the request ID. Once signed into the app, the app submits the received request ID to the mobile backend 330, which in turn queries the request queue on the CSP 320 for a request matching this ID. The app also provides the authentication token obtained from the mobile customer IDP 345 (described with respect to FIG. 2). The mobile backend 330 then retrieves the request with the correct ID from the queue and makes sure that the parameters of the request match its own capabilities (trust level, MFA abilities, etc). The mobile backend may also validate that the request has not expired. The mobile backend 330 may also retrieve ATM information from the request (such as the location). The mobile backend 330 then displays a notification on the mobile device of the customer asking them if they are attempting to authenticate at the specific ATM, whilst providing the location of the ATM. The customer is then able to confirm in the app that they are indeed trying to authenticate at that ATM. Furthermore, if the request contained a requirement for MFA, the app asks the customer to scan their face or finger before proceeding. Once the customer confirms they are trying to authenticate and performs any necessary MFA, the mobile app then sends confirmation to then mobile backend 330, which then generates a new customer authentication response. The response contains core customer identifier (or some other universal customer ID), as well as other customer details, including the fact that MFA was performed. The response also contains the original request ID. The response includes the authentication token that was obtained by the CAP from Okta 325 (described in relation to FIG. 2). Once the token is verified by the CSP, this authentication response is then submitted into the response queue on the CSP 320. The API that accepts such responses verifies the token from the CAP, making sure that this CAP is entitled to submit responses with the provided attributes (trust level, MFA performed, etc). The ATM (or rather ATM backend services) is monitoring the response queue and when the response is added it receives the authentication response and notifies the ATM that the customer has been authenticated, providing customer's details to the ATM. Then, the ATM presents new menu options to the customer to proceed with regular ATM transactions.

In the case of a customer making use of an ITM and communicating with a remote teller, the authentication process is conducted as follows. Firstly, a customer walks up to an ITM and is presented with multiple menu options and instructions. One such option is to speak with a remote teller. If the customer selects this option a communication link is established with a remote teller. The remote teller asks the customer to present physical identification (bank card, driver's license, etc). Then the customer informs the teller that they do not have documents with them and would like to proceed with cardless authentication. The remote teller then has two options. Either they can proceed in a similar manner as set out above for authentication at an in-branch teller by asking the customer their name etc. and then generating and submitting an authentication to CSP. Alternatively, they can send instructions to the ITM such that a QR code and/or OTP is displayed on the ITM. In that case, the authentication proceeds in a similar manner as set out above in relation to authentication at an ATM or kiosk. However, in both of these cases, the authentication response is returned to the remote teller's computing device to authenticate the identity of the individual. After authentication, the remote teller is then able to assist the user with their transaction.

As noted above, Customer Authentication Consumers (CAC) generate authentication requests. These requests include a set of data indicating certain information associated with the request. The requests contain information describing who can fulfil them. The requirements for fulfilling a request may be risk based and/or capability based and/or customer preference based. The following is an example of potential properties a request may contain:

- Request ID
- CAC ID
- Issue Date/Time
- Expiry Date/Time
- Request Additional Details—optional
  - Description—purpose of this request to show to the customer
  - Location—ex branch or ATM location
  - Secret—may be used as additional verbal OTP
- Customer ID—optional
- Required CAP ID—optional if specific CAP is requested, ex: mobile banking app
- Required CAP Capabilities/Roles—optional
  - Internal to NCR
  - MFA light
  - MFA biometric
  - Geolocation
  - Etc
- Required CAP Trust Score—optional
- Required CAP Actions—optional, actions CAP must perform prior to fulfilling a request
  - Perform MFA
  - Prompt for password
  - Etc The following is an example of potential properties a response may contain:

- Response ID
- CAP ID
- Request ID—request ID to which this is a response
- Issue Date/Time
- Customer Details
  - Customer ID
  - etc.
- Actions Performed-optional, required if request contained "Required CAP Actions" that needed to be performed.

It is also noted that various criteria can be used to classify Customer Authentication Providers. Before credentials are issued to a potential CAP, they must go through a vetting process in order to determine the eligibility as well as trust level. Once this vetting process is complete, credentials can be issued to this CAP and the resulting tokens (after authentication) will contain information about the capabilities of this provider.

Some of the inputs used to determine the eligibility and the trust level of a provider are:

| Criteria | Required? | Weight |
|---|---|---|
| Is provider internal to NCR? | | 20 |
| Is provider enforcing minimum password difficulty requirements? | Yes | |
| Does provider offer MFA via SMS or Email? | | 5 |
| Does provider offer MFA via biometrics? | | 20 |
| Does provider offer geolocation information? | | 10 |
| Does provider require re-authentication regularly (TBD)? | | 5 |

Using the criteria above, a potential CAP must meet all "required" criteria and then the trust level score will be calculated based on sum of weights of other non-required criteria that are met. Authentication requests can then specify required trust level or explicitly request criteria that are required before a request can be fulfilled by a CAP. Authentication requests can also require a specific CAP to fulfil a request. Required trust levels or specific required criteria that CAPs must meet may be risk driven. For example, if a required transaction is deemed risky (opening accounts, withdrawing large sums of money, etc) then the customer authentication consumer may request a high trust level requirement or request biometric authentication specifically, etc.

When authentication is required for a transaction, risk based trust scores can be requested by the Customer Authentication Consumer (CAC). Not all transactions or interactions are of equal risk (from a financial fraud perspective). If a customer simply needs to sign up for a newsletter, or join a customer survey, etc—those are extremely low risk transactions. As such, authentication requests for those types of transactions may require a very low trust score. However, if a customer asks to withdraw large amounts of cash or close/open accounts—those are high risk transactions and may require a high trust score provider. The system and/or operator may determine which trust level is required prior to issuing a customer authentication request or after issuing an initial authentication request. Various transaction types, or perhaps even whole points of interaction (such as branch or ATM) may be pre-assigned risk levels and may drive required trust levels from CAPs.

Once a CAP trust level requirement is established, an identity of an individual can be authenticated as described above. A CAC may produce a customer authentication request and specify required trust score. Optionally the CAC may go further and specify actual attributes that a provider must have, like MFA. When CAPs look/monitor for requests to fulfil, they may filter based on trust level that they can fulfil—i.e. their own trust level should be equal to or higher than the requested score in the customer authentication request. Further, once a provider is fulfilling the request, their trust score may be verified again by the API to make sure that it matches or surpasses that of the requested one.

Figure 4:
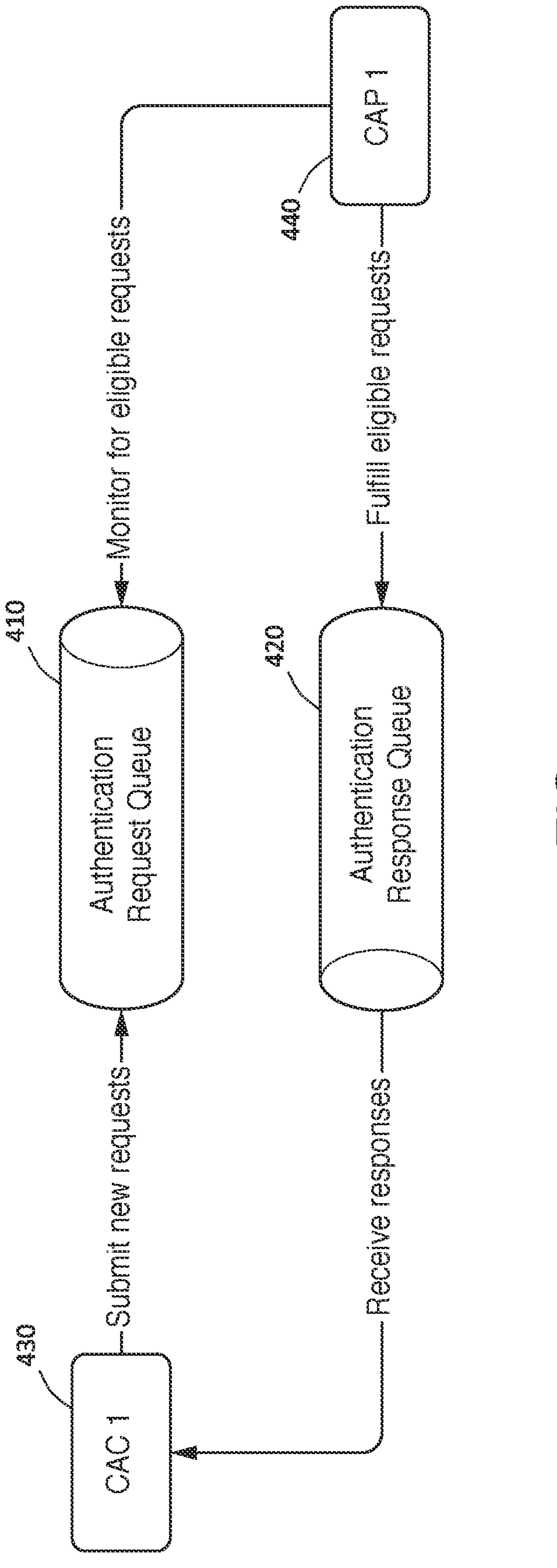
FIG. 4 illustrates authentication request and response queues.

FIG. 4 illustrates authentication request queue 410 and an authentication response queue 420. As described above, once an authentication request is generated and transmitted to the CSP by a CAC 430, the request is added to the request queue 410. One or more CAPs 440 can monitor the request queue and fulfil outstanding requests. When the requests are fulfilled by a CAP, an authentication response is prepared and transmitted to the authentication response queue 420. The authentication response is then transmitted to the CAC 430 that generated the initial request. This results in the identity of an individual wishing to perform a transaction to be authenticated.

Figure 5:
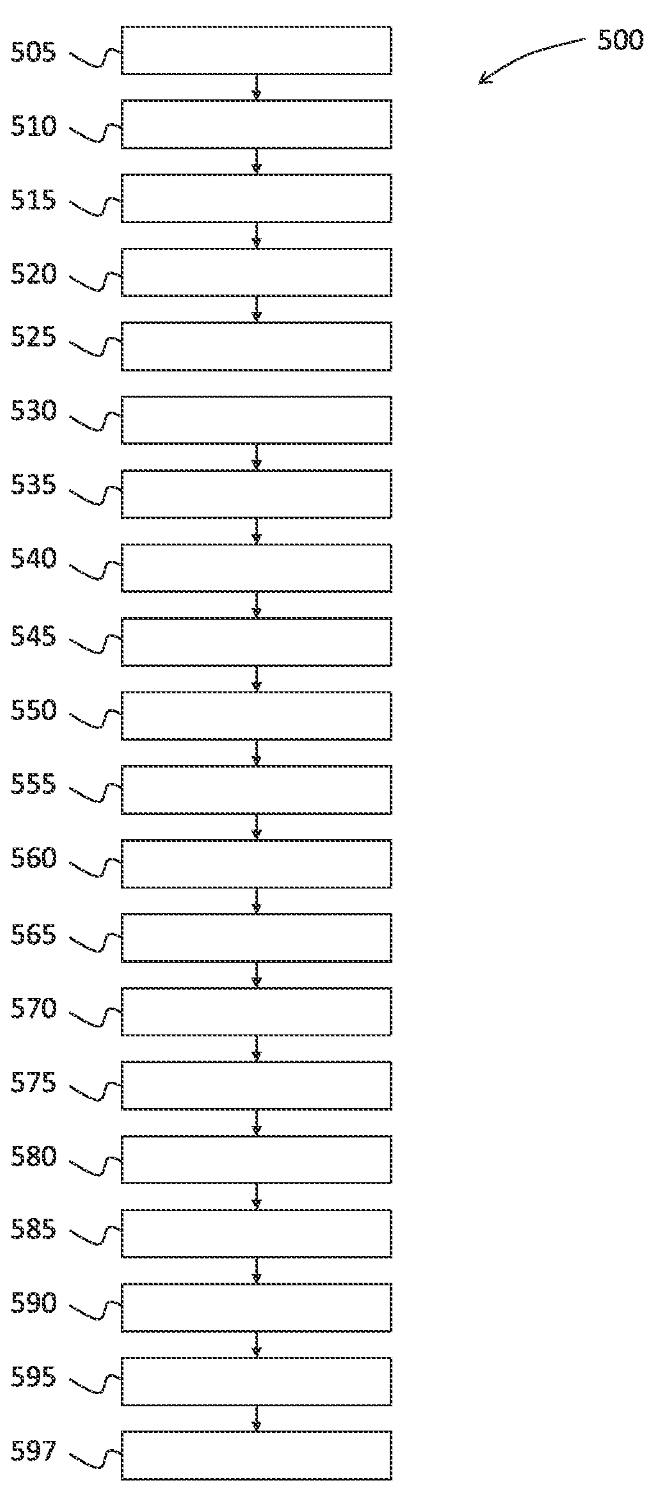
FIG. 5 illustrates a flowchart of certain steps taken when authenticating an identity of an individual.

FIG. 5 illustrates a flowchart 500 outlining a methodology for authenticating an identity of an individual. In a first step 505, an authentication provider module is executed on a computing device that is external to a trusted computing system. The authentication provider module is configured to authenticate the identity of the individual independently of the trusted computing system. Then, in a next step 510, an application programming interface (API) is executed on a server of the trusted computing system. The API is configured to communicate with the authentication provider module. Also, in a step 515, another application programming interface (API) is executed on the server. This API is configured to communicate with computing devices within the trusted system (e.g., ATMs, teller devices, kiosks or the like). In a next step 520, the authentication provider module communicates with a trusted identity provider module of the trusted computing system and the authentication provider module is provided with an authentication token issued by the trusted identity provider module. The token is sent to the server in a next step 525, to thereby pre-register the authentication provider module with the trusted system. A number of authentication providers may pre-register in this way and in a next step 530, data indicating a list of available authentication providers that are able to fulfil authentication requests is stored in a memory of the server. After registration, the authentication provider module continuously transmits, in a next step 535, pings to the server to indicate the authentication provider is available to fulfil authentication requests. In a next step 540, a computing device of the trusted system detects an input event indicating that an individual is to be authenticated via a cardless authentication process. This input event may correspond to the individual making a selection on the graphical user interface of a display of the computing device. In response to this, in a next step 545, the computing device generates an authentication request that may be a set of data including at least a request identifier for the request and a device identifier for the computing device. In a next step 550, the authentication request is transmitted to the server. In a next step 555, the authentication request is provided to an authentication request queue on the server. This queue is monitored by the authentication provider module in a next step 560. The authentication provider module determines, in a step 565, that an authentication request that it can fulfil has been transmitted to the server (and added to the queue). In response to this, the authentication provider module pulls the request from the queue and uses the information in the request to authenticate the identity of the individual that is the subject of the authentication request in a step 570. This may be achieved by a mobile device of the customer transmitting an authentication token, that has been issued by an identity provider module external to the trusted computing system, to the authentication provider module in a step 575. Once the identity of the individual is authenticated with the authentication provider module, the authentication provider module transmits a response to the authentication request (an authentication response) to the server in a step 580. This authenticates, in the trusted system, the identity of the individual. The response includes the authentication token issued by the trusted identity provider module of the trusted system which is authenticated by the server in a step 585. The authentication response is then added to a response queue on the server in step 590. The response queue is monitored by the computing device that generated the authentication request in a step 595. Then, in a step 597, the authentication response is transmitted to that computing device. This authenticates the identity of the individual at the specific computing device that generated the original authentication request.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The invention claimed is:

1. A computer-implemented method for authenticating, in a trusted computing system, an identity of an individual, comprising the steps of:

transmitting, by a first computing device of a trusted computing system to a server of the trusted computing system, an authentication request for authenticating, in the trusted computing system, the identity of an individual, the authentication request including a request identifier associated with an interaction at the first computing device;

determining, by an authentication provider software module that is pre-registered with the trusted computing system and that is executing on a second computing device external to the trusted computing system, that the authentication request has been transmitted to the server of the trusted computing system, by receiving, at the authentication provider software module, an indication of the authentication request including the request identifier;

responsive to said determining, authenticating, by the authentication provider software module, the identity of the individual using authentication factors or credentials obtained by the authentication provider software module and not accessible to the trusted computing system;

responsive to said authenticating, transmitting, bythe authentication provider software module, an authentication response to the authentication including the request identifier to the server of the trusted computing system, thereby authenticating, in the trusted computing system, the identity of the individual;

providing an authentication token, issued by a trusted identity provider software module of the trusted computing system, to the authentication provider software module;

pre-registering the authentication provider software module with the trusted computing system by providing the authentication token to the server when transmitting the response to the authentication request to the server, providing the authentication token; and authenticating, by the server, the authentication token to authenticate the authentication provider software module.

2. The method as claimed in claim 1, further comprising: transmitting, by the server, said response to the authentication request to the first computing device.

3. The method as claimed in claim 1, further comprising: detecting, by the first computing device, an input event indicating that the individual is to be authenticated via a cardless authentication process.

4. The method as claimed in claim 3, further comprising: generating, by the first computing device, the authentication request responsive to detecting the input event.

5. The method as claimed in claim 4, further comprising: generating the authentication request as a set of data comprising at least a request identifier for the request and a device identifier for the first computing device.

6. The method as claimed in claim 1, further comprising: responsive to receiving the authentication request at the server, providing the authentication request to an authentication request queue on the server.

7. The method as claimed in claim 6, further comprising: monitoring, by the authentication provider software module, the authentication request queue on the server for authentication requests that can be fulfilled by the authentication provider software module.

8. The method as claimed in claim 1, further comprising: responsive to receiving the response to the authentication request at the server, providing the response to an authentication response queue on the server.

9. The method as claimed in claim 8, further comprising: monitoring, by the first computing device, the authentication response queue for responses to authentication requests generated by the first computing device.

10. The method as claimed in claim 1, further comprising: executing an application programming interface on the server, that is configured to communicate with the authentication provider software module.

11. The method as claimed in claim 1, further comprising: executing an application programming interface on the server, that is configured to communicate with the first computing device.

12. The method as claimed in claim 1, further comprising: storing, in a memory on the server, data indicating a list of available authentication provider software modules able to fulfil authentication requests.

13. The method as claimed in claim 1, further comprising: providing an authentication token, issued by an identity provider software module external to the trusted computing system, to a computing device of the individual; and when authenticating the identity of the individual via the authentication provider software module, transmitting the authentication token from the computing device of the individual to the authentication provider software module.

14. The method as claimed in claim 1, further comprising: continuously transmitting, by the authentication provider software module, a ping to the server to indicate the authentication provider software module is available to fulfil authentication requests.

15. A communication network, comprising:

a trusted computing system comprising a first computing device and a server;

a non-trusted computing system, external to the trusted computing system, comprising a second computing device executing a respective authentication provider software module that is pre-registered with the trusted computing system and that is configured to authenticate an identity of an individual independently of the trusted computing system;

wherein the first computing device is configured to:

transmit an authentication request to the server, for authenticating, in the trusted computing system, the identity of the individual, the authentication request including a request identifier associated with an interaction at the first computing device;

wherein the respective authentication provider software module is configured to:

receive an indication of the authentication request including the request identifier, determine that the authentication request has been transmitted to the server;

authenticate the identity of the individual using authentication factors or credentials obtained by the authentication provider software module and not accessible to the trusted computing system; and transmit an authentication response including the request identifier to the server to thereby authenticate, in the trusted computing system, the identity of the individual;

providing an authentication token, issued by a trusted identity provider software module of the trusted computing system, to the authentication provider software module;

pre-registering the authentication provider software module with the trusted computing system by providing the authentication token to the server;

when transmitting the response to the authentication request to the server, providing the authentication token; and authenticating, by the server, the authentication token to authenticate the authentication provider software module.

16. The communication network as claimed in claim 15, wherein the first computing device is an Automated Teller Machine or Self-Service Terminal or kiosk.

17. The communication network as claimed in claim 15, wherein the first computing device is a desktop computer or a laptop or a mobile device of a bank teller.

18. The communication network as claimed in claim 15, wherein the second computing device is a server of the non-trusted computing system and the respective authentication provider software module is a mobile backend associated with a mobile banking application executing on a mobile device of the individual.

* * * * *